United States Patent [19]

Coffey

[11] 4,227,406
[45] Oct. 14, 1980

[54] WIND DIRECTION DEVICE

[76] Inventor: James M. Coffey, 320 E. Walnut Ave., El Segundo, Calif. 90245

[21] Appl. No.: 34,494

[22] Filed: Apr. 27, 1979

[51] Int. Cl.³ .............................................. G01W 1/00
[52] U.S. Cl. ........................................ 73/188; 116/26; 116/265
[58] Field of Search ................. 73/188; 116/26, 35 R, 116/264, 265

[56] References Cited

U.S. PATENT DOCUMENTS

| | | | |
|---|---|---|---|
| 3,395,577 | 8/1968 | Keim | 73/188 |
| 3,815,412 | 6/1974 | Keim | 73/188 |

Primary Examiner—Jerry W. Myracle
Attorney, Agent, or Firm—Charles T. Silberberg

[57] ABSTRACT

A wind direction device for attachment to a boat shroud for indicating the direction of the wind relative to the direction of travel of the boat. The device includes several wraps of adhesive tape around a boat shroud to form an upwardly facing shoulder at a midpoint of the shroud of the boat, a bearing resting on the shoulder and having a hole through which is received the shroud, which bearing has a slit in one side and is sufficiently flexible and resilient so that the size of the slit can be varied to position the bearing around the shroud and retain the bearing on said shroud, a tubular mandrel resting on the bearing and having a bore through which the shroud is received, the mandrel having a slit traversing the length of the mandrel, the mandrel being of sufficient flexibility and resilience such that the size of the slit can be varied to position the mandrel around the shroud and retain the mandrel on the shroud, and a resilient vane connected to the periphery of the mandrel.

14 Claims, 11 Drawing Figures

WIND DIRECTION DEVICE

BACKGROUND OF THE INVENTION (a) Field of the Invention

This invention relates to wind direction devices particularly adapted for boats, and more specifically to such devices adapted to be mounted on the shroud of sailing craft.

(b) Description of the Prior Art

In the navigation of sailing boats, it is desirable that the helmsman know the direction of the wind relative to direction of travel of the boat. This is in order that he can make optimum use of the wind.

Embodiments of the present invention are preferably mounted on one or more of the shrouds which stabilize a boat mast. The particular elevation of the device on the shroud will vary according to the individual desires of the boat operator, however, the wind direction device will always be mounted at a point intermediate to the end of the shroud. Further, it is impracticable to disconnect either end of the shroud for the purpose of attaching the wind direction device. Accordingly, there must be provided means for securing the wind direction device to the shroud without disconnecting either end of the shroud.

There has been provided in the past wind direction devices comprising a strip of light cloth tied to the shroud. However, such approach has the disadvantage that the strip rapidly becomes wrapped around the shroud and useless and tends to flutter or ripple in the wind. The present invention includes a resilient vane, e.g. a strip of Mylar material, mounted so that it may freely swing around the shroud, thereby evading the problem just mentioned.

PRIOR ART STATEMENT

U.S. Pat. No. 3,395,577 to Keim discloses a wind direction device attached to a boat shroud which comprises a flexible tail which is connected to a flexible link which rests on a flexible bearing which in turn rests on an upwardly facing shoulder. The shroud passes through holes in the link and the bearing. Slits in the link and the bearing allow such elements to be fitted onto the boat shroud with a twisting motion.

While the Keim device overcomes the prior art problem of cloth tied directly to the shroud becoming wrapped around the shroud, it still utilizes a flexible or cloth-like tail. This is necessary so that the tail can be tied to the link by passing the tail through a hole in the link which is spaced from the hole which accommodates the shroud and knotting the tail to the link. This type of tail which is lacking in stiffness is prone to ripple and flutter and therefore as compared to the present invention may be more unattractive, unstable and inaccurate under some velocity wind conditions.

SUMMARY OF THE INVENTION

It is, therefore, an object of the present invention to provide an improved wind direction device particularly adapted for boats.

It is another object of the present invention to provide a wind direction device which may be quickly and easily mounted to a mid-portion of a shroud supporting the mast of the boat.

It is yet another object of the present invention to provide a wind direction device for boats which avoids becoming entangled in the boat shroud.

It is another object of the present invention to provide a wind direction device for boats which is highly accurate, even under calm wind conditions.

Briefly, in accordance with the invention, there is provided in combination with a boat shroud, a wind direction device comprising an upwardly facing shoulder, a bearing, a tubular mandrel, and a resilient vane. The shoulder is secured to the shroud at a mid-portion thereof. The bearing rests on the shoulder and has a hole therethrough with a slit connecting the hole and the periphery of the bearing. The shroud passes through the hole in the bearing. The bearing is made of a material of sufficient flexibility and resilience such that the size of the slit can be varied to position the bearing around the shroud and retain the bearing on the shroud. A tubular mandrel engages the bearing. The mandrel has a bore therethrough with a slit which traverses the length of the mandrel. The slit connects the bore and the periphery of the mandrel. The shroud passes through the bore of the mandrel. The mandrel is made of a material of sufficient flexibility and resilience such that the size of the slit can be varied to position the mandrel around the shroud and retain the mandrel on the shroud. The resilient vane is connected to the periphery of the mandrel.

In the preferred embodiment, the slit in the mandrel has a spiral configuration and the vane is substantially pennant-shaped with the wide end of the vane having a layer of adhesive thereon for connection to the periphery of the mandrel. The vane is connected to the periphery of the mandrel such that the vane always projects outwardly and substantially normal to the shroud.

Other objects and advantages of the invention will become apparent upon reading the following detailed description and upon reference to the drawings.

While the invention will be described in connection with the preferred embodiments, it will be understood that it is not intended to limit the invention to those embodiments. On the contrary, it is intended to cover all alternatives, modifications, and equivalents that may be included within the spirit and scope of the invention as defined by the appended claims.

DETAILED DESCRIPTION OF THE INVENTION

Figure 1:
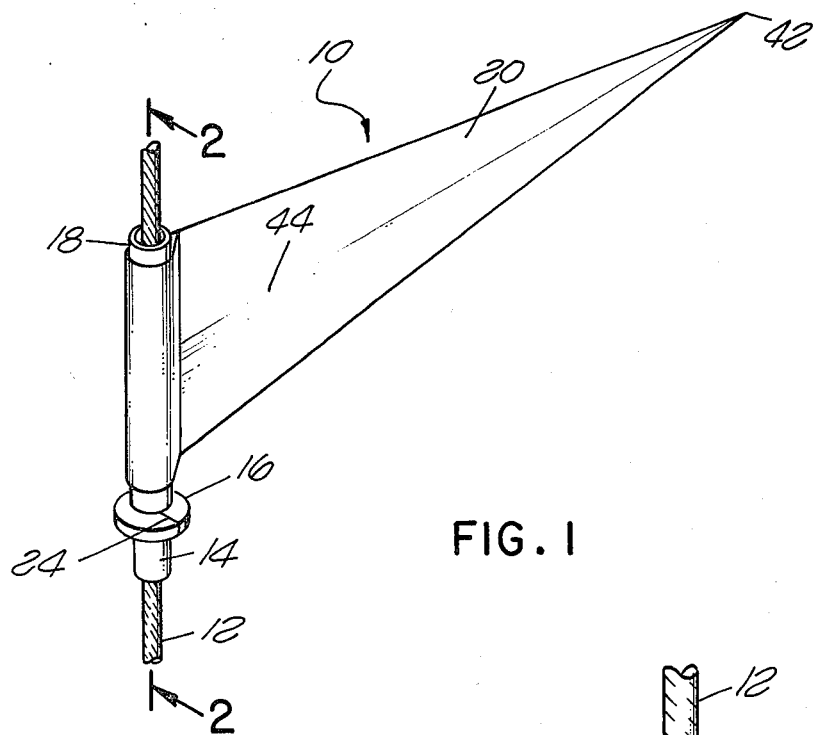
FIG. 1 is a perspective view of a wind direction device, in accordance with the invention, mounted on a shroud.

Turning first to FIG. 1, there is illustrated a wind direction device according to the present invention generally indicated at 10. The wind direction device 10 is mounted on a shroud 12. The device 10 is comprised of an upwardly facing shoulder 14 secured to shroud 12, a bearing 16 resting on shoulder 14, a tubular mandrel 18 engaging the bearing 16, and a resilient vane 20 connected to the periphery of mandrel 18 for rotation therewith.

Figure 3:
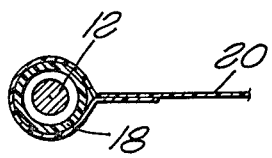
FIG. 3 is a sectional viw of the wind direction device taken in the direction of arrows 3—3 of FIG. 2.
Figure 2:
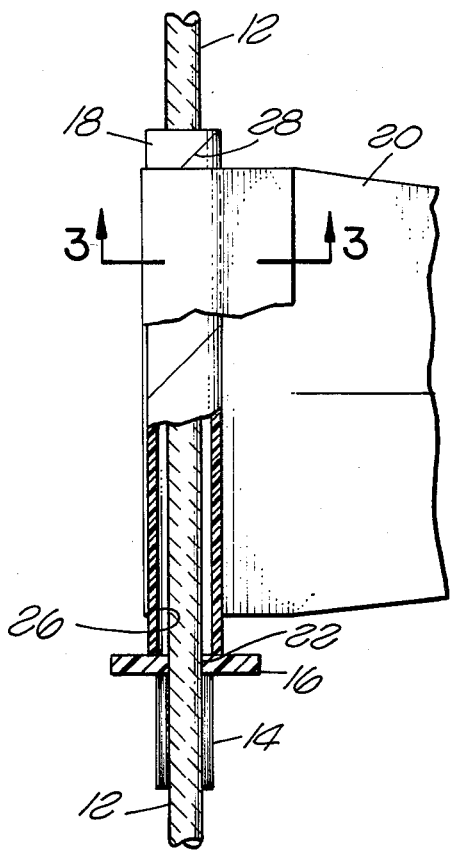
FIG. 2 is a fragmentary sectional view of the wind direction device of FIG. 1 taken in the direction of arrows 2—2 of FIG. 1.

With additional reference to FIGS. 2 and 3, upwardly facing shoulder 14 forms the rest for the various other pieces of device 10. To this end, there is found around the shroud 12 at the desired point, a strip of adhesive tape which makes up shoulder 14. The adhesive tape of shoulder 14 is of such length that it is wound around the shroud 12 many times in order to provide an upwardly facing shoulder. Other means could be used to provide the upwardly facing shoulder. For example, there could be used a piece of lead having a slit in one side, which piece would be crimped on the shroud. However, adhesive tape is preferable because it is readily available. Frther, such pieces to be crimped on the shroud are not readily adaptable to larger sized shrouds.

The upper edge of shoulder 14 provides a somewhat rough surface. Accordingly, there is provided a bearing 16 disposed above the shoulder 14. The bearing 16, which is preferably shaped like a washer, has a hole 22 through the middle of the annular body of the bearing. The bearing 16 is further defined by a slit 24 connecting the hole 22 with the periphery of the body of the bearing.

The bearing 16 is made of flexible, resilient, slick material, such as plastic, i.e. nylon or teflon. This allows the size of the slit to be varied to position bearing 16 around shroud 12 and yet retain bearing 16 on shroud 12. In order to position bearing 16 around shroud 12, the user will, for example, take the portion of the bearing body immediately to the left of slit 24 between the fingers of his left hand and the portion of the bearing body immediately to the right of slit 24 in his right hand. Then by applying a twisting motion to the body of the bearing 16, the opening provided by the slit 24 may be effectively widened sufficiently to pass the shroud 12 into the hole 22.

In the preferred embodiment, the slit 24 has essentially no lateral width. That is, the portion of the bearing 16 immediately to the left of slit 24 is normally in close proximity, or abutting, the portion of the bearing on the opposite side of the slit. However, the slit 24 could have lateral width so long as the width is less than the diameter of shroud 12.

Disposed above and resting on or engaging bearing 16 is a tubular mandrel 18, preferably made of a material similar to the bearing 16. The periphery of mandrel 18 has a uniform diameter. Tubular mandrel 18 has a bore 26 therethrough. Bore 26 is of a diameter somewhat larger than the diameter of shroud 12. Mandrel 18 has a slit 28 traversing the length of mandrel 18 which connects bore 26 with the periphery of mandrel 18. Similarly to bearing slit 24, slit 28 preferably has essentially no lateral width. This slit 28 acts as a means for selectively forming an opening in the mandrel 18 for receiving the shroud 12 therethrough. The size of slit 28 can be varied such that mandrel 18 can be positioned around shroud 12 and also retain mandrel 18 on shroud 12. Slit 28 in the embodiment illustrated in FIGS. 1-3 has a spiral configuration. Such a configuration tends to maintain the circular shape of mandrel 18 after twisting of mandrel 18 to open the slit 18 and to more securely (than a straight slit) retain mandrel 18 around shroud 12. Similarly to the case of bearing 16, by applying a twisting motion to opposite ends of mandrel 18, slit 28 is opened to a width sufficient to accommodate the diameter of shroud 12, whereupon shroud 12 may be passed through the slit 18 into bore 26.

Figure 4:
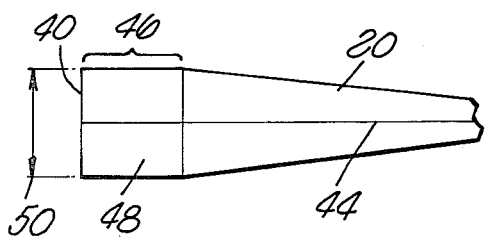
FIG. 4 is a fragmentary plan view of a resilient vane used in the present invention prior to its connection to the tubular mandrel.

With reference to FIGS. 1, 3, and 4, there is shown the vane 20 which forms a significant part of the present invention. Vane 20 is substantially pennant-shaped having a wide end 40 which tapers to a point 42. Vane 20 is made of a resilient material such as polyester film, i.e. Mylar. It is important that vane 20 be resilient and therefore have some rigidity so that it retains its shape and projects outwardly and substantially normal to the shroud and thereby does not get tangled on rotation around shroud 12, even under calm conditions. Vane 20 is provided with a centrally located longitudinal crease 44. The purpose of the crease 44 is to stiffen the vane 20 to assure the needed rigidity. The pennant shape for vane 20 is highly desirable because in addition to being ornamental, it also serves as a pointer of wind direction by tapering to point 42.

The width of wide end 40 of vane 20 preferably remains constant for a portion 46 of vane 20. After portion 46, the width of vane 20 tapers to point 42. On one side of vane 20 on portion 46 is provided an adhesive layer 48. Preferably, adhesive layer 48 would initially be covered by a removable backing (not shown).

As shown in FIGS. 1 and 3, vane 20 is connected to mandrel 18 by wrapping portion 46 (which would be exposed by removal of the backing layer) of vane 20 around the periphery of mandrel 18 with adhesive layer 48 bearing against the periphery of mandrel 18. In this manner, vane 20 is bonded to mandrel 18. Vane 20 should be of a material which is also sufficiently flexible such that portion 46 can in fact be wrapped around mandrel 18 as shown. Portion 46 normally substantially overlaps the periphery of mandrel 18. Optimally, there would be some excess of portion 46 which could be bonded to itself as shown in FIG. 3. As previously noted, the periphery of mandrel 18 has a uniform diameter. This enables an even connection of portion 46 to mandrel 18 and thereby a more satisfactory bond. In addition, the width 50 of end 40 is preferably substantially the same as the length of mandrel 18. This helps to assure satisfactory bonding, tends to hold mandrel 18 straight, and assures free rotation of vane 20.

As can be seen in FIG. 1, by attaching vane 20 to mandrel 18 by wrapping portion 46 around the periphery of mandrel 18 with adhesive layer 48 bonding portion 46 of vane 20 to mandrel 18, the vane 20 always projects outwardly and substantially normal to shroud 12. Thus, even under calm wind conditions, the resilient vane 20 will be pointing outwardly with point 42 in the direction of the wind as opposed to the prior art cloth type direction indicators which would normally hang limply beside shroud 12. By virtue of vane 20 being attached to mandrel 18, the two members are thereby connected for rotation together. In this regard, mandrel 18 is free to rotate around shroud 12 on bearing 16. This allows vane 20 to be rotated in any direction around shroud 12 without the entangling problems of the prior art.

Figure 5:
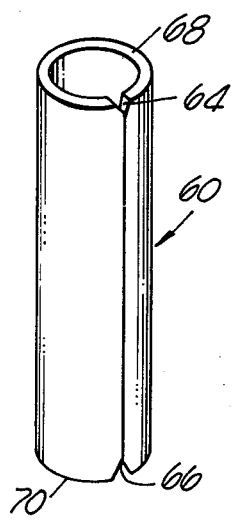
FIG. 5 is a perspective view of a second embodiment of the tubular mandrel which is used according to the present invention.
Figure 6:
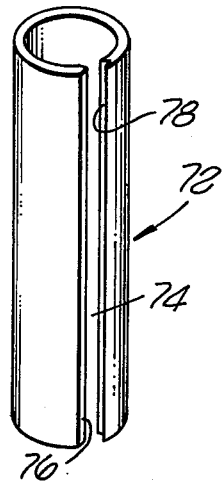
FIG. 6 is a perspective view of a third embodiment of the tubular mandrel which is used according to the present invention.
Figure 7:
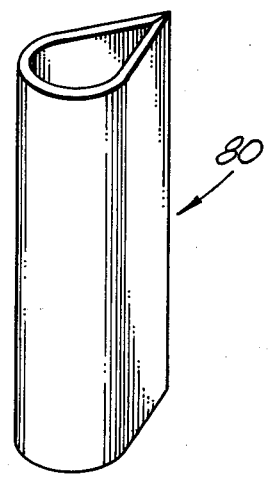
FIG. 7 is a perspective view of a fourth embodiment of the tubular mandrel which is used according to the present invention.

FIGS. 5-7 illustrate other embodiments for the tubular mandrel. Thus, in FIG. 5, there is shown a mandrel generally indicated at 60 which has a straight slit 62 which traverses the length of mandrel 60. Having a straight slit 62 makes the mandrel easier to manufacture and easier to place around shroud 12, but does not provide the security of fastening around the shroud 12 that the spiral slit 28 provides. It should be noted that at opposite ends of slit 62 are provided notches 64 and 66. These notches avoid the problem of excess material or uneven surfaces on ends 68 and 70 of slit 62 in the manufacture of mandrel 60. A protruding portion on ends 68 and 70 of mandrel 60 could prevent or hamper free rotation of mandrel 60 on bearing 16.

In FIG. 6, there is shown another embodiment of the mandrel generally indicated at 72 which has a straight slit 74 (which is shown in a slightly open position) which has an additional locking mechanism. The locking mechanism is formed by one edge of slit 74 having a protruding longitudinal ridge 76 while the opposite edge of slit 74 has a longitudinal groove 78. Ridge 76 has a wedge shape while groove 78 has a complementary V-shape cross section which accommodates ridge 76. By using this type of fastening mechanism, mandrel 72 is more securely retained around shroud 12 by the edges of the slit 74 being kept in line.

In FIG. 7 there is shown another embodiment for the tubular mandrel which is generally indicated at 80. Mandrel 80 has an airfoil configuration. Such a shape reduces the drag of the wind direction device and also provides better accuracy.

Figure 8:
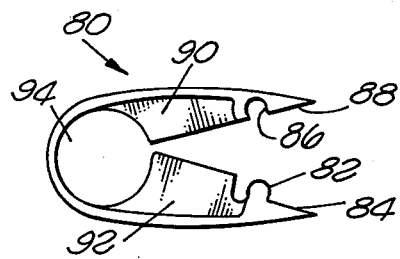
FIG. 8 is a plan view of a fifth embodiment of the tubular mandrel which is used according to the present invention shown in an open position.
Figure 10:
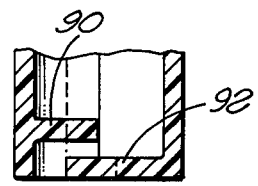
FIG. 10 is a sectional view of the fifth embodiment of the tubular mandrel taken in the direction of arrows 10—10 of FIG. 9.
Figure 9:
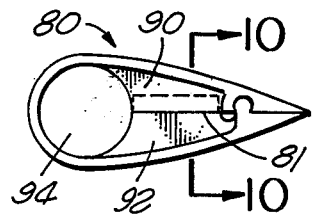
FIG. 9 is a plan view of the fifth embodiment of the tubular mandrel shown in the closed or locked position.

While a straight slit without a locking mechanism, such as 62 in FIG. 5, can be used for mandrel 80, it is preferred that a locking mechanism such as illustrated in FIGS. 8 and 9 be employed. Similar to the embodiment of FIG. 6, a longitudinal ridge 82 is provided on one side 84 of the slit 81 while a corresponding longitudinal groove 86 is provided on the other side 88 of the slit 81. Mandrel 80 is also preferably provided with overlapping lateral flanges 90 and 92 protruding from the inner periphery of mandrel 80 near the lower end thereof. The overlap of flanges 90 and 92 is best seen in FIGS. 9 and 10. The purpose of flanges 90 and 92 is to restrict the size of bore 94 of mandrel 80. This assures that once mandrel 80 is placed around a shroud 12, the mandrel will be positioned upright rather than in a leaning fashion.

Figure 11:
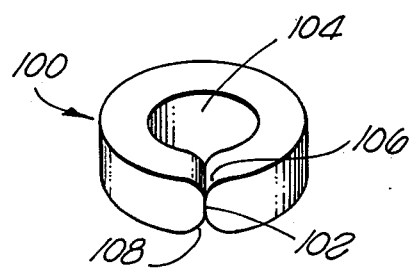
FIG. 11 is a perspective view of a second embodiment of the bearing used according to the present invention.

FIG. 11 illustrates an alternative embodiment for bearing 16. The bearing of FIG. 11, which is generally indicated at 100, has a slit 102 connecting hole 104 with the periphery of the body of the bearing 100. On opposite ends of slit 102 are notches 106 and 108. Like notches 64 and 66, notches 106 and 108 are provided to obviate the problem of protruding material from slit 102, i.e. such as where the opposite sides of the bearing 100 which forms slit 102 are positioned unevenly. This allows for the free rotation of the tubular mandrel on bearing 100.

While advantageous embodiments have been chosen to illustrate the invention, it will be understood by those skilled in the art that various changes and modifications can be made thereto without departing from the scope of the invention as defined in the claims.

What is claimed is:

1. In combination with a boat shroud, a wind direction device comprising:
    an upwardly facing shoulder secured to said shroud at a mid portion thereof;
    a bearing resting on said shoulder and having a hole therethrough with a slit connecting said hole and the periphery of said bearing, said shroud passing through said hole, said bearing being made of a material of sufficient flexibility and resilience such that the size of said slit can be varied to position said bearing around said shroud and retain said bearing on said shroud;
    a tubular mandrel engaging said bearing, said mandrel having a bore therethrough with a slit traversing the length of said mandrel connecting said bore and the periphery of said mandrel, said shroud passing through said bore, said mandrel being made of a material of sufficient flexibility and resilience such that the size of said slit in said mandrel can be varied to position said mandrel around said shroud and retain said mandrel on said shroud; and
    a resilient vane connected to the periphery of said mandrel.

2. The wind direction device of claim 1 wherein said mandrel has an airfoil shape.

3. The wind direction device of claim 2 wherein said vane is connected to the periphery of said mandrel such that said vane projects outwardly and substantially normal to said mandrel under all wind conditions.

4. The wind direction device of claim 3 wherein said vane has a connecting means for connecting the periphery of said mandrel thereto.

5. The wind direction device of claim 4 wherein said connecting means comprises a layer of adhesive on a portion of said vane.

6. The wind direction device of claim 5 wherein said portion of said vane substantially overlaps the periphery of said mandrel.

7. The wind direction device of claim 6 wherein said vane is substantially pennant-shaped, and said portion of said vane having an adhesive layer thereon is at the wider end of said vane.

8. The wind direction device of claim 7 wherein the periphery of said mandrel has a uniform diameter.

9. The wind direction device of claim 8 wherein the width of the wider end of said vane is substantially the same as the length of said mandrel.

10. The wind direction device of claim 9 wherein said vane is made of Mylar.

11. The wind direction device of claim 3 wherein said mandrel has a notch at each end of said slit in said mandrel, and said bearing has a notch at each end of said slit in said bearing.

12. The wind direction device of claim 1 wherein said slit in said mandrel has a spiral configuration.

13. The wind direction device of claim 12 wherein said vane is connected to the periphery of said mandrel such that said vane projects outwardly and substantially normal to said shroud under all wind conditions.

14. The wind direction device of claim 12 wherein said mandrel has a notch at each end of said slit in said mandrel, and said bearing has a notch at each end of said slit in said bearing.

* * * * *